(12) United States Patent
Hiratsuka et al.

(10) Patent No.: US 6,201,686 B1
(45) Date of Patent: Mar. 13, 2001

(54) ELECTRIC DOUBLE LAYER CAPACITOR

(75) Inventors: Kazuya Hiratsuka; Manabu Suhara; Katsuji Ikeda; Takeshi Kawasato, all of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/184,115

(22) Filed: Nov. 2, 1998

(30) Foreign Application Priority Data

Nov. 10, 1997 (JP) .................................... 9-321947

(51) Int. Cl.⁷ ................ H01G 9/00; H01G 9/10
(52) U.S. Cl. .............. 361/502; 361/519; 361/522; 361/537
(58) Field of Search .............. 361/301.1, 301.3, 361/302, 500, 502, 503, 508, 516, 521, 522, 517, 518, 519, 532, 534–539, 541; 174/66; 220/3.8, 241

(56) References Cited

U.S. PATENT DOCUMENTS

| | | | | |
|---|---|---|---|---|
| 1,758,255 | * | 5/1930 | Hudd ................................. | 361/503 |
| 1,920,799 | * | 8/1933 | Lilienfeld ............................ | 361/519 |
| 4,131,935 | * | 12/1978 | Clement ............................. | 361/520 |
| 5,579,203 | * | 11/1996 | Klaschka ............................ | 361/519 |
| 5,798,906 | * | 8/1998 | Ando et al. ........................ | 361/520 |

* cited by examiner

*Primary Examiner*—Kristine Kincaid
*Assistant Examiner*—Eric W. Thomas
(74) *Attorney, Agent, or Firm*—Oblon, Spivak, McClelland, Maier & Neustadt, P.C.

(57) ABSTRACT

An electric double layer capacitor having electrode terminals 70a, 70'a which are attached to a metallic cover plate 65 in an electrically insulated state wherein each of the electrode terminals 70a, 70'a has an engaging plate 76 formed integrally with a shaft portion of the electrode terminal so as to engage with an electrically insulating plate 80 disposed inside the metallic cover plate 65 whereby a rotating motion of the terminal with respect to its axial direction is prevented.

17 Claims, 4 Drawing Sheets

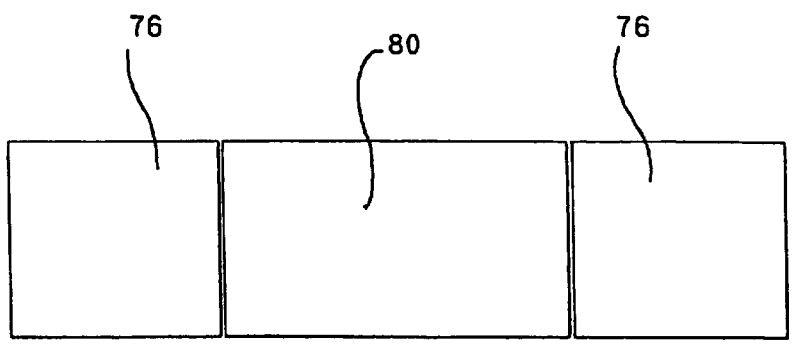
*FIG. 5A*
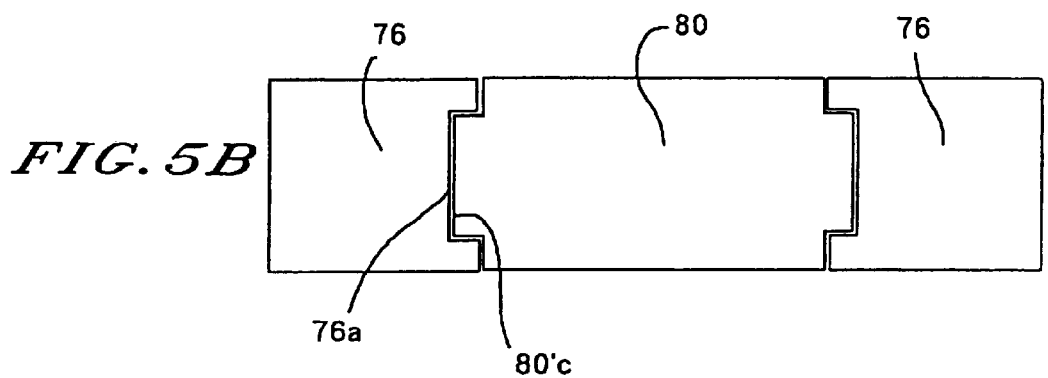
*FIG. 5B*
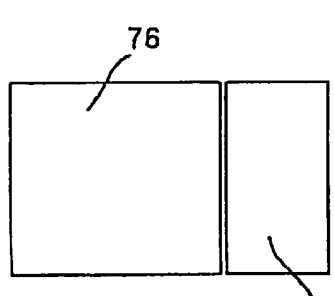 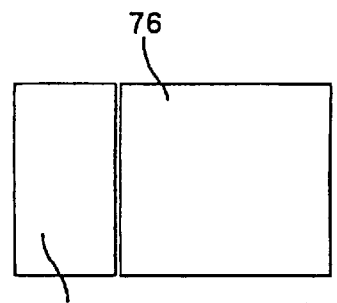
*FIG. 5C-1*   *FIG. 5C-2*
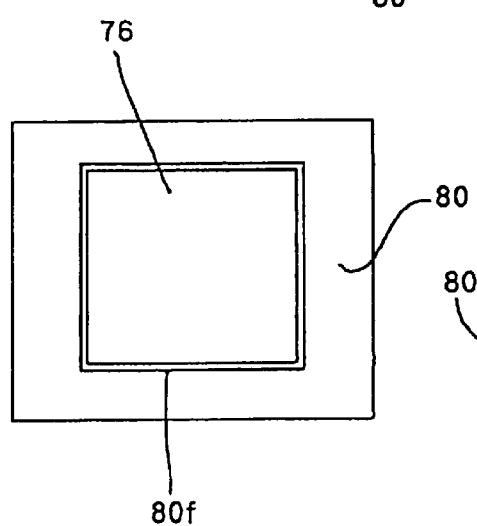 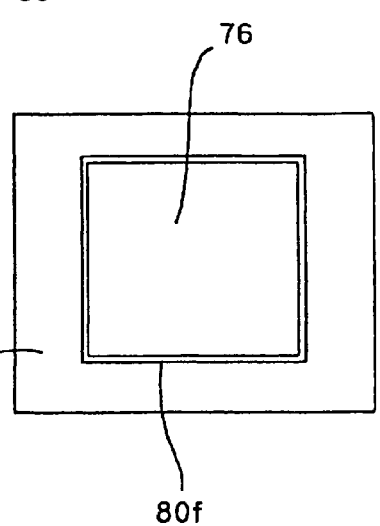
*FIG. 5D-1*   *FIG. 5D-2*

ELECTRIC DOUBLE LAYER CAPACITOR

BACKGROUND OF THE INVENTION

1. Field of the Invention

The present invention relates to an electric double layer capacitor comprising electrode terminals which are attached to a metallic casing in an electrically insulated state. In particular, it relates to an electric double layer capacitor wherein the rotation of the electrode terminals along with a locking element is prevented.

2. Discussion of Background

Recently, an electrochemical element such as an electric double layer capacitor and so on having a large capacity and a high output, which is applicable to a vehicle-mounted driving power source or the like, has been noted and developed.

As a structure for a large-sized electric double layer capacitor suitable for discharging a heavy current, an electric double layer capacitor having a rectangular structure is known as described in Japanese Unexamined Patent Publications: JP-A-4-154106, JP-A-7-264715, JP-A-7-307250, JP-A-7-272986, JP-A-8-45793 and so on. Such type of electric double layer capacitor is shown in FIG. 1. Namely, a plurality of positive electrodes 25 each comprising a generally rectangular metallic current collector on both sides of which electrode layers are formed and each provided with a current collecting lead 52, and a plurality of negative electrodes 25' having the same structure as the positive electrodes and provided with current collecting leads 54 are alternately stacked by interposing therebetween separators to form a stacked assembly 50 from which the current collecting leads 52, 54 are extended. The positive current collecting leads 52 are electrically connected by means of caulking or welding to a positive current collecting terminal 75 attached to a cover member 65. In the same manner as above, the negative current collecting leads 54 are electrically connected to a negative current collecting terminal 77 attached to the cover member 65. The stacked assembly 50 is received in a bottomed rectangular casing 60 filled with an electrolyte. Then, the cover member is hermetically fitted to the rectangular casing.

There has been known an electric double layer capacitor having a cylindrical structure as disclosed in Japanese Unexamined Patent Publications: JP-A-154106, JP-A-7-307250, JP-A-8-45795 and so on. Such type of electric double layer capacitor is fabricated as follows. A belt-like positive electrode obtained by forming electrode layers composed mainly of an activated carbon or the like on both surfaces of a metallic current collector and a belt-like negative electrode having the same structure as the positive electrode are stacked by interposing a belt-like separator. The stacked product is rolled to form a rolled assembly. The rolled assembly is received in a bottomed cylindrical metallic casing filled with an electrolyte. Current collecting leads drawn from the positive electrode and the negative electrode are respectively connected to electrode terminals attached to an electrically insulating cover member, and then, the cover member is fitted to the cylindrical metallic casing.

Since the electric double layer capacitor used for a vehicle-mounted driving power source is required to withstand vibrations and impacts occurring during the driving of a vehicle and to have a mechanical strength free from deformation while providing a high hermetic condition in the same manner as a vehicle-mounted battery, it is desirable that the casing and the cover member are made of a metallic material. In this case, the electrode terminals must be completely electrically insulated from the metallic cover member. Accordingly, it is necessary for an insulating material to have resistance to the electrolyte. Also, a sufficient care should be taken of a hermetically sealing property of the capacitor.

The inventors of this application tried to use a washer of synthetic resin and a ring of synthetic elastomer having a solvent resistance and hermetic properties to obtain a sufficient insulation to the electrode terminals and the metallic members. However, they have found that it is difficult to obtain a successful achievement. Namely, they have found a phenomenon that when screw terminals for the electrode terminals are to be fixed by means of nuts, the screw terminals are easily rotated along with the turning of the nuts for fastening.

The rotation of the screw terminals along with the nuts makes it impossible to completely fasten the washer of synthetic resin and the ring of synthetic elastomer whereby it is difficult to assure a sufficient insulation and hermetic properties.

If a capacitor having such a defect is used for a vehicle-mounted driving power source or the like, the screw terminals are loosened and rotate due to vibrations and impacts received. Then, the overall electrode terminals are rotated along with the fastening means with a result that there is a danger that the current collecting leads fixed to the current collecting terminals of the electrode terminals by caulking or the like may be cut off from the terminals due to a pulling force or a twisting force applied to the electrode terminals. If the screw terminals are loosened due to vibrations or the like, it is necessary to fasten the screw terminals again. However, the fastening operation may cause the twisting of the current collecting leads connected to the electrodes in an opposite direction.

Japanese Unexamined Utility Model Publication JP-U-52-67944 discloses such a technique that tinplate is used as an anti-turning piece for preventing the rotating of the screw terminal; the tinplate is bonded to the nut for the screw terminal by soldering, and the tinplate is bent to wrap a pressing plate. However, such a technique has disadvantages that impurities in a soldering material may enter into the capacitor; the anti-turning mechanism occupies a relatively large volume in the capacitor, and the capacity of the capacity per unit volume is small.

SUMMARY OF THE INVENTION

It is an object of the present invention to provide an electric double layer capacitor having electrode terminals attached to a cover member covering a metallic casing in an electrically insulated state wherein a rotating motion of the electrode terminals is prevented.

In accordance with the present invention, there is provided an electric double layer capacitor which comprises a positive electrode provided with a positive current collecting lead and a negative electrode provided with a negative current collecting lead which are opposed by interposing a separator in a bottomed metallic casing filled with an electrolyte, wherein at least one of the positive current collecting lead and the negative current collecting lead is connected to at least one of electrode terminals attached in an electrically insulated state to a metallic cover member for sealing an opening of the metallic casing; each of the electrode terminals has an engaging plate formed integrally with a shaft portion of the terminal, and the engaging plate is engaged with an electrically insulating member disposed inside the metallic cover member to prevent the electrode terminal from rotating with respect to the axial direction of the terminal.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIGS. 5a to 5d are respectively plan views showing relations between an engaging plate and the electrically insulating member.

DETAILED DESCRIPTION OF PREFERRED EMBODIMENT

Preferred embodiments of the present invention will be described with reference to the drawings.

Figure 2:
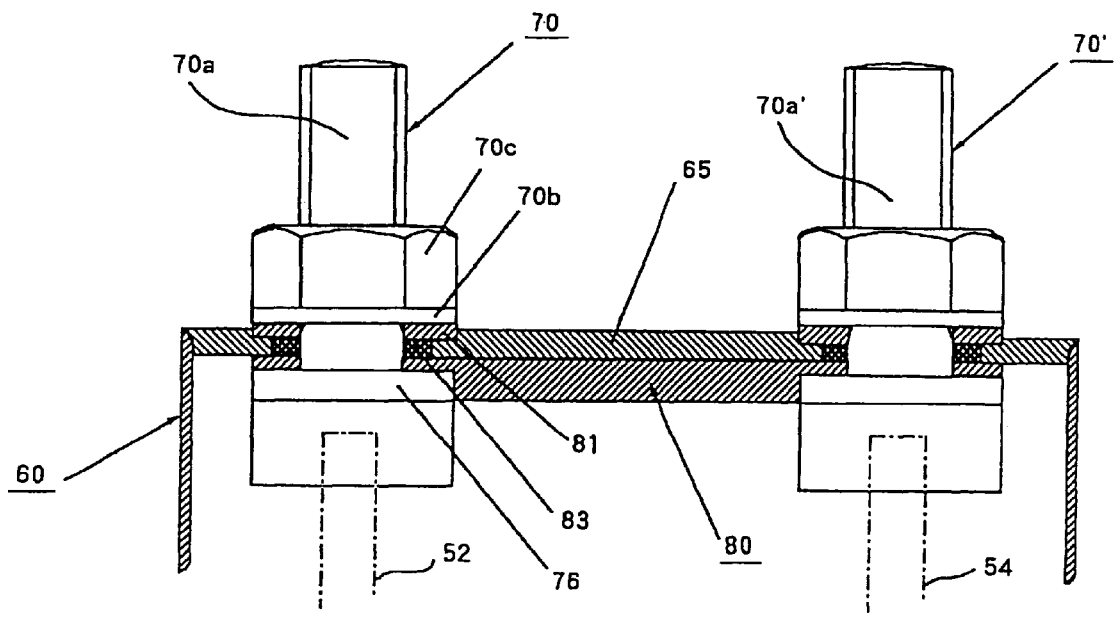
FIG. 2 is a cross-sectional view of a relevant portion of the electric double layer capacitor wherein the attachment of electrode terminals onto a cover member is shown.

FIG. 2 shows a rectangular type electric double layer capacitor as a preferable embodiment of the present invention which shows how electrode terminals are attached to a metallic cover member.

In FIG. 2, positive current collecting leads 52 and negative current collecting leads 54, which are drawn from a stacked assembly comprised of positive and negative electrodes and separators, are respectively attached to paired positive terminal 70 and negative terminal 70' which are fixed to a metallic cover member 65 for sealing an upper portion of a metallic casing 60.

The positive terminal 70 and the negative terminal 70' are attached to the metallic cover member 65 by interposing an insulating material so as to provide an electrically insulated state.

More detailed description will be made.

Figures 4A, 4B:
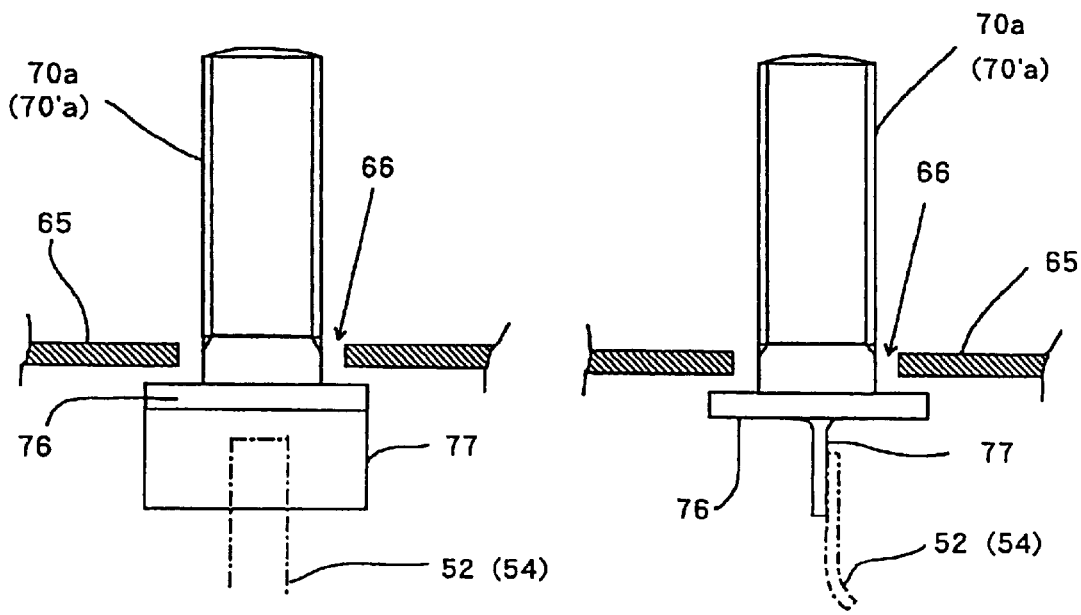
FIGS. 4a and 4b are respectively a front view and a side view showing an embodiment of a screw terminal used for the capacitor.

FIGS. 4a and 4b show a preferred embodiment of a screw terminal 70a (or 70'a) which constitutes an electrode terminal for the electric double layer capacitor. The screw terminal as the electrode terminal makes it possible to take a current of large capacity in comparison with a spot pin or the like.

The screw terminal is provided with an engaging plate 76 at its one end. The engaging plate is formed integrally with a shaft portion of the screw terminal. Accordingly, when the screw terminal is fitted to a through hole 66 formed in the metallic cover member, the engaging plate is engaged with an outer peripheral portion of the through hole to prevent the screw terminal from coming off from the through hole and the engaging plate provides the base for securing the screw terminal to the metallic cover member.

The engaging plate is made of a metallic material. Accordingly, the current collecting leads 52 (54) may be connected to the engaging plate itself so that it functions as a current collecting terminal.

However, it is preferable for the current collecting terminal to have a current collecting plate 77 in order to stably fix the current collecting leads. Specifically, it is preferable to provide the current collecting plate 77 at a lower portion of the engaging plate so that it is electrically connected to the engaging plate as shown in FIGS. 4a and 4b.

FIG. 2 is a cross-sectional view showing electrode terminals and elements associated thereto in the electric double layer capacitor of the present invention. In FIG. 2, the screw terminal 70a (70'a) is fitted to a through hole formed in the metallic cover member, and the screw terminal is fixed to the metallic cover member 65 by interposing a washer 70b with a nut 70c to thereby form the electrode terminal. In order to electrically isolate the screw terminal 70a, the washer 70b and the engaging plate 76 from the metallic cover member 65, an electrically insulating member 80, an insulating washer 81 and an insulating ring 83 are preferably used as insulating members. As shown in FIG. 2, the electrically insulating member 80 is mainly for isolating from the engaging plate 76; the insulating washer 81 is mainly for isolating from the washer 70b and the insulating ring 83 is mainly for insulating from the shaft portion of the screw terminal respectively.

Figure 3A:
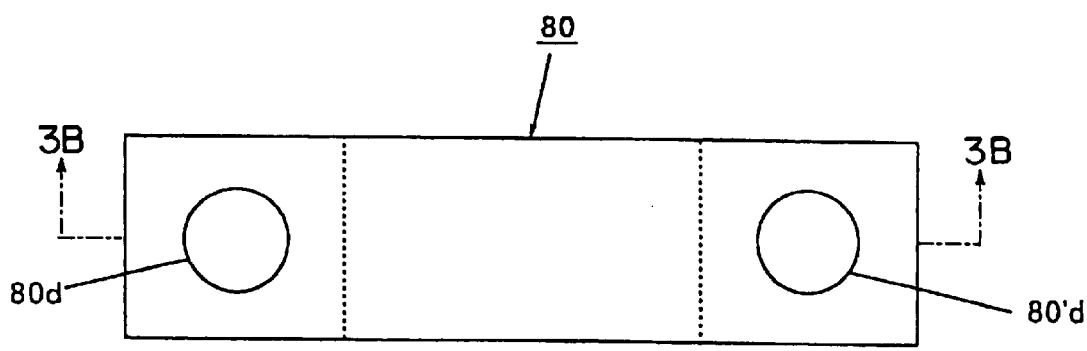
FIGS. 3a and 3b are respectively a plan view and a cross-sectional view showing an embodiment of an electrically insulating member for the capacitor.
Figure 3B:
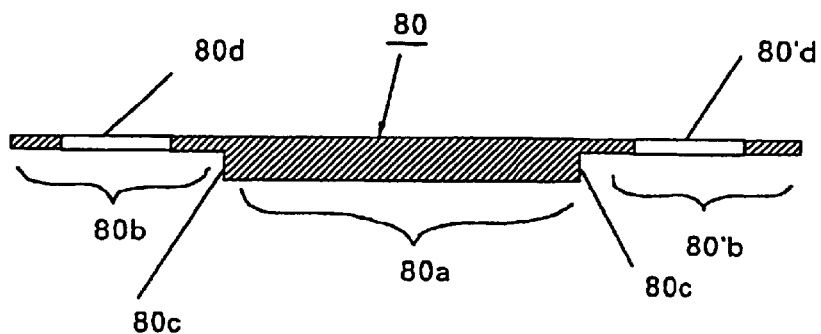

FIGS. 3a and 3b are respectively a plan view and a cross-sectional view taken along a line A—A which show an embodiment of the electrically insulating member 80.

The electrically insulating member 80 in this embodiment is comprised mainly of an engage-fixing portion 80a having a thickened wall at a central portion and insulating portions 80b, 80'b at both sides of the central portion. The engage-fixing portion 80a is firmly fixed to an inner surface of the metallic cover member by suitable means such as screwing, an adhesive or the electrode terminal which is described later. Further, the engage-fixing portion 80a has engaging surfaces 80c adapted to engage with each engaging plate 76 so that the rotation of the engaging plate is completely prevented. Namely, the engaging plate 76 is in a state of complete one-piece structure with the shaft portion of the screw terminal 70a. Accordingly, even when the nut 70c is turned for fastening, the engaging plate is retained by the electrically insulting member 80 whereby there is no danger of the rotating of the screw terminal along with the nut.

In the insulating portions 80b, 80'b at both sides of the electrically insulating member 80, there are respectively formed opening portions 80d, 80'd in which the shaft portions of the screw terminals are inserted. The insulating portions 80b, 80'b are portions for effecting insulation between the engaging plates and the metallic cover member, namely, these function as insulation washers. Since the electrically insulating member has two opening portions 80d, 80'd at its both sides, which are adapted to receive the shaft portions of the screw terminals, the electrically insulating member can be fixed to the metallic cover member with the screw terminals. The above-mentioned is a preferred embodiment in a case of using a single electrically insulating member wherein the single electrically insulating member is engaged with the engaging plate of each of the two electrode terminals to prevent the rotation of the two terminals in their axial directions while the electrically insulating member is fixed to the cover member by means of the two terminals.

The electrically insulating member 80 may be constituted by separate elements comprising the engage-fixing portion 80a and the insulating portions 80b, 80'b.

As described above, the rotation of the screw terminal is prevented by providing the structure that an outer peripheral portion of each of the engaging plates 76 is brought to contact and be engaged with the electrically insulating member. In this case, as shown in FIG. 4, since the engaging plate is made larger than the diameter of the shaft portion of the screw terminal, a torque for rotating the shaft portion of the screw terminal is far smaller than a torque acting on in an opposite direction whereby the rotation of the screw terminal along with the nut can easily be prevented.

The shape of the engaging plate 76 is generally rectangular as shown in FIG. 5a. However, the shape is not limited thereto, and it may take a shape as shown in FIG. 5b wherein a recessed portion 76a is formed in a part of it so as to be fitted with a corresponding projecting portion 80'c formed in the engaging surface 80c of the electrically insulating member 80. Thus, the meshing of the engaging plate with the electrically insulating member prevents the rotation of the screw terminal.

Further, the electrically insulating member 80 may be separated into two portions: an electrically insulating member for a positive electrode terminal 80' and an electrically insulating member for a negative electrode terminal 80".

Figure 6:
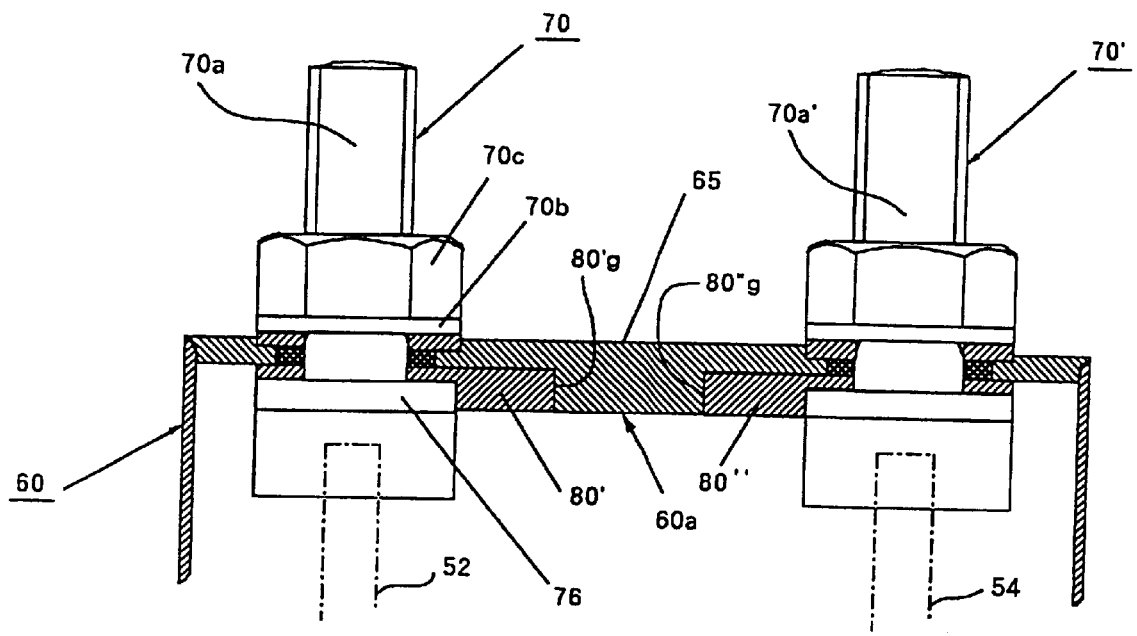
FIG. 6 is a cross-sectional view showing an embodiment of the electric double layer capacitor of the present invention wherein the attachment of electrode terminals onto a cover member is shown.

When two electrically insulating members 80', 80" are used, the electrically insulating members are respectively fixed at only a single position with a single screw terminal. In this case, accordingly, it is desirable to form a land portion 60a at an inner surface of the metallic cover member 65 so that edge portions 80'g, 80"g of the electrically insulating members 80', 80" are brought to engage with shoulder portions of the land portion 60a to fix the electrically insulating members to the cover member, as shown in FIG. 6. Alternatively, means for engaging the electrically insulating member with the metallic cover member may be constituted by forming an appropriate number of small projections in the electrically insulating member or the cover member; forming the corresponding number of openings in the cover member or the electrically insulating member facing thereto; and fitting the projections to the openings so that the electrically insulating member is engaged with the metallic cover member.

FIG. 5d shows another embodiment of engaging the electrically insulating member with the metallic cover member. Namely, an opening portion 80f which is so adapted as to fit the outer configuration of the engaging plate 76 is formed in each of the two electrically insulating members 80 and the engaging plates are fitted to the opening portions. The electrically insulating member having the above-mentioned shape assures a sufficient fitting and engagement with the engaging plate. In this case, it is preferable to form a recessed portion in the cover member and to fit tightly the electrically insulating member entirely in the recessed portion so that the electrically insulating member is engaged with the metallic cover member.

It is preferable that the engaging plate have basically a square shape. However, when a part of a circular engaging plate may be cut off to form a recessed portion to which a projection formed in the electrically insulating plate is fitted, or a part of the circular engaging plate is trimmed to form a linear portion to which a linear edge of the electrically insulating plate is brought to contact.

The metallic cover member may be provided with an opening to which a safety valve is attached or from which an electrolyte is injected. In this case, the electrically insulating member is preferably provided with an opening at a position corresponding to the opening of the metallic cover member.

Material for the electrically insulating member of the present invention is not particularly limited, and may be a synthetic resin, ceramics, glass and so on. The synthetic resin may, for example, be resin having a high mechanical strength such as polyethylene, polypropylene, urea resin, polyacetal, poly(meth)acrylate, nylon resin, polyimide resin, polyamidoimide resin, polyurethane, fluoro resin [polytetrafluoroethylene (PTFE), ethylene tetrafluoride-propylene hexafluoride copolymer, polyvinyl fluoride (PVDF)], polyether ether ketone (PEEK), polyether sulfone (PES), polyphenylene sulfide (PPS), epoxy resin or the like. More preferably, it is desirable to use a polyimide resin, a polyamidoimide resin, fluorine resin, PEEK, PES, PPS from the viewpoint that they have a heat resistance property of about 200° C. Further, in order to further improve the mechanical strength and the heat resistance property, it is preferred to incorporate a fibrous filler such as glass fibers, alumina fibers, silica fibers, carbon fibers or the like to these resins.

The method for forming the electrically insulating member is not in particular limited. Although it is more preferable to use an injection molding method, a cast polymerization method or a molding method in combination with a mechanically cutting method may be used. The insulating washer can be formed with the same material as any material suitable for the electrically insulating member.

The insulating ring is for keeping the gap between the insertion hole and the shaft portion in an airtight condition, and preferably has heat resistance properties. As a material for the insulating ring, fluoro rubber, silicone rubber, acrylic rubber, epichlorohydrin rubber, chlorinated polyethylene rubber, nitrile rubber, nitrile-isoprene rubber or the like, may be mentioned.

Although the structure that the above-mentioned paired positive terminal and negative terminal are attached to the metallic cover member for closing airtightly the opening of the bottomed metallic casing is the most preferably embodiment according to the present invention, the present invention is generally well applicable to such an embodiment that at least one of the electrode terminals is attached in an electrically insulated state to the metallic cover member for sealing the opening portion of the metallic casing. For example, an embodiment that the positive terminal is attached to the metallic cover member for sealing the opening portion of the bottomed metallic casing and the metallic casing itself constitutes a negative pole, or an embodiment that the positive terminal and the negative terminal are respectively attached to metallic cover members which respectively seal both opening portions in a cylindrical metallic casing. In either case, each of the electrode terminals has an engaging plate formed integrally with its shaft portion, and the engaging plate is engaged with the electrically insulating member disposed inside the metallic cover member to prevent the rotation of the terminal with respect to the axial direction of the terminal.

The current collecting member used in the present invention may be of an electrically conductive material having anticorrosion properties in terms of electrochemistry and chemistry, and an electrically conductive rubber, graphite or a metallic foil such as an anticorrosive metal, aluminum, stainless steel, nickel, tantalum or the like can be used. In particular, a stainless steel foil, an aluminum foil or a foil made of an alloy of these materials is preferred. In the present invention, a metallic current collecting member made of such a metallic foil and having a thickness of about 10 $\mu$m–0.5 mm is preferably used.

Electrode layers are formed on both faces of the metallic current collecting member. Each of the electrode layers is formed as follows. In carbon powder having a large specific surface area such as activated carbon, polyacene (specific surface area of about 800–3,500 m$^2$/g) as the measure component, carbon black or carbon whisker as an electric conductive material and PTFE, PVDF, carboxymethylcellulose or the like as a binder are added to prepare a mixture. The mixture is kneaded in the presence of a fluid lubrication agent such as alcohol followed by pressing with a roller to thereby form a sheet-like molded product, the sheet-like molded product is dried, and it is bonded to each face of the metallic current collecting member by heat pressing or with an electric conductive adhesive agent.

Instead of using the above-mentioned kneading technique, a solvent (water, N-2-methylpyrrolidone or the like) for the binder may be mixed to prepare slurry, and the slurry is coated on both surfaces of the metallic current collecting member followed by drying whereby the electrode layers are formed.

A plurality of current collecting leads are formed on the metallic current collecting member or the electrode. For the current collecting leads, tab terminals having electric conductivity, wires, tapes, ribbons or the like are used, and they may be attached to the metallic current collecting member at a position where the electrode layer is not formed. However, it is preferable that a portion without the electrode layer is formed in a part of the metallic current collecting member to use that portion as the current collecting leads.

A porous separator which allows ions to pass therethrough is sufficient for the separator. As an example of the separator, a fine porous polyethylene film, a fine porous polypropylene film, a polyethylene nonwoven fabric, a polypropylene nonwoven fabric, a glass fiber-mixed nonwoven fabric, a glass mat filter or the like is preferably used.

It is preferable that as shown in FIG. 2, for example, the positive terminal and the negative terminal each formed of the screw terminal is attached to the metallic cover member by using nuts by interposing the insulating washers, the hermetically sealing insulating rings and the electrically insulating members while an electrically insulating state is assured.

In accordance with the present invention, a stacked assembly formed by stacking alternately a plurality of rectangular positive electrodes each provided with a positive current collecting lead and a plurality of rectangular negative electrodes each provided with a negative current collecting lead by interposing separators is prepared. Or, a rolled assembly formed by rolling a plurality of belt-like positive electrodes each provided with a positive current collecting lead and a plurality of belt-like negative electrodes each provided with a negative current collecting lead by interposing separators is prepared. The stacked assembly or the rolled assembly is received in a bottomed metallic casing. The current collecting leads drawn from the stacked assembly or the rolled assembly is preferably gathered followed by caulking or welding to form a single current collecting lead, and the single current collecting lead is electrically connected to the current collecting terminal of the positive terminal or the negative terminal by means of welding or caulking. Then, an electrolyte is supplied into the casing to immerse the electrodes. The cover member is airtightly attached to the upper opening of the metallic casing by means of caulking to thereby form a capacitor. In the case of caulking, it is preferable to use an electrically insulating gasket made of an insulating material such as fluoro rubber, silicone rubber, butyl rubber, propylene or the like. As a preferable embodiment, the opening portion of the metallic casing may be sealed with the metallic cover member by using laser welding.

A metallic material for forming the metallic casing and the metallic cover member is preferably such a material permitting a drawing operation. For the metallic material, aluminum, iron, stainless steel, nickel, tantalum may be mentioned. Further, aluminum and its alloy and stainless steel are more preferable. In particular, aluminum of 99.9% or more is more preferable.

The electrolyte used may be of a well known type. As an aqueous solution type, sulfuric acid aqueous solution, sodium sulfate aqueous solution, sodium hydroxide aqueous solution, potassium hydroxide aqueous solution, ammonium hydroxide aqueous solution, potassium chloride aqueous solution, potassium carbonate aqueous solution and so on may be mentioned.

It is preferred for an organic solvent type to use a solution of a salt comprising a cation represented by $R^1R^2R^3R^4N^+$ or $R^1R^2R^3R^4P^+$ (wherein each of $R^1$, $R^2$, $R^3$ and $R^4$ is a $C_{1-5}$ alkyl group independently) and an anion such as $BF_4^-$, $PF_6^-$ or $ClO_4^-$ and an organic solvent such as propylene carbonate, ethylene carbonate, diethyl carbonate, ethyl methyl carbonate, γ-butyrolactone, acetonitrile, dimethylformamide, sulfolane or the like.

The above-mentioned technique of the present invention that each of the electrode terminals has the engaging plate formed integrally with its shaft portion, the engaging plate is engaged with the electrically insulating member disposed inside the metallic cover member to prevent the rotation of the electrode terminal with respect to its axial direction whereby the electrode terminal is prevented from rotating due to vibrations and impacts applied thereto, can be preferably applicable not only to a rectangular or a cylindrical electric double layer capacitor but also another type of capacitor such as an electrolytic capacitor for an electrochemical element such as battery.

Now, the present invention will be described in detail with reference to Examples. However, it should be understood that the present invention is by no means restricted by such specific Examples. In the following, a symbol "%" indicates "% by weight".

EXAMPLE 1

Preparation of a Stacked Assembly

Figure 1:
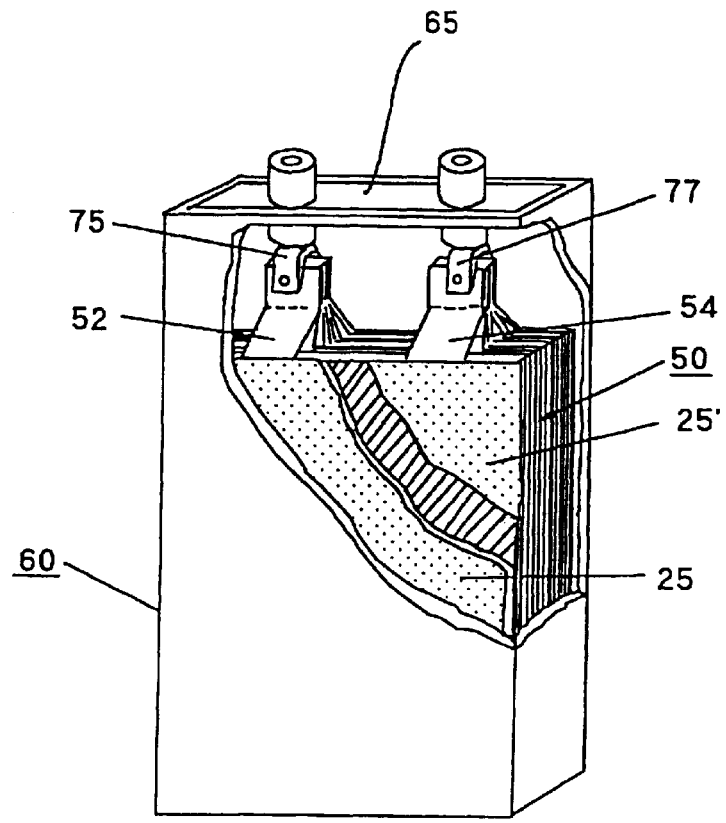
FIG. 1 is a diagram showing a rectangular stacking type electric double layer capacitor.

An electrode element having the structure as shown in FIG. 1 was used.

Ethanol was added to a mixture comprising 80% of active carbon powder, 10% of carbon black and 10% of PTFE as a binder, followed by kneading. The kneaded mixture was formed into an elongated sheet of 100 mm wide×0.3 mm thick by roll-pressing. The elongated sheet was dried at 130° C. for 2 hours to obtain a sheet-shaped electrode. Sheets of 100 mm×100 mm were cut out from the sheet-shaped electrode. The sheets were bonded by using a graphite type electric conductive adhesive, to both surfaces of an etched aluminum foil of a thickness of 100 μm provided with current collecting leads 52, 54 of 20 mm×40 mm, to thereby produce a positive electrode. In the same manner as above, a negative electrode was produced.

15 positive electrodes and 15 negative electrodes were stacked alternately by interposing therebetween nonwoven fabrics of glass fibers of 105 mm square and 0.15 mm thick, as separators to obtain a stacked assembly. The stacked assembly was dried at 200° C. for 3 hours. The receiving and fixing of the stacked assembly.

A bottomed aluminum casing having a height of 127 mm, a width of 114 mm, a depth of 30 mm and a wall thickness of 1.5 mm was used as a container. An aluminum plate having a width of 114 mm, a height of 30 mm and a wall thickness of 2 mm was used as the cover member.

An electrically insulating member having the shape as shown in FIG. 3 was prepared by injection-molding a material comprising PTFE and 25% of glass fibers as a filler. The same material was used to prepare the insulating washers. For the insulating ring of rubber, fluoro rubber was used. The electrically insulating member was fixed to the cover member by bolt-fastening at its central portion.

The insulating member, the insulating rings and the insulating washers were arranged at positions as shown in FIG. 2, and the screw terminal 70a for the positive electrode and the screw terminal 70'a for the negative terminal were fixed to the cover member with nuts. When the nuts are fastened, a relatively large torque is applied to the screw terminals. However, there was found no rotation of the screw terminals along with the nuts.

15 Current collecting leads were respectively drawn from the stacked assembly and they were gathered by caulking. They were respectively connected to the positive current collecting terminal and the negative current collecting terminal by welding.

A propylene carbonate solution containing tetraethylphosphonium tetrafluoroborate having 1 molar concentration was put into the casing through a liquid injection port (not shown in FIG. 2) to immerse the stacked assembly. An aluminum cover member was airtightly welded by laser welding to the opening portion of a bottomed aluminum casing to obtain a stacked type capacitor.

Vibration Tests

Table 1 shows a discharge capacity of the capacitor and an average discharge output obtained from an average discharge voltage wherein the capacitor is charged with 2.5V, and then, the charged voltage reaches 0V by discharging a constant current of 100 A.

Then, the capacitor was fixed to a vibration test machine and was vibrated for 1 hour while vibration cycle was changed (by alternately changing between 13 Hz and 30 Hz for 5 min) under the application of a vibration acceleration of 3 G (in X, Y and Z directions). As a result, no leakage of the electrolyte was found. Further, the electrode terminals were kept in a firmly fixed state, and there was found no screw terminal being loosened.

Table 1 also shows a discharge capacity of the capacitor and an average discharge output obtained from an average discharge voltage wherein the capacitor is discharged with 2.5V, and then, the voltage reaches 0V by discharging a constant current of 100 A, after the vibration test. The results revealed substantially the same performance as that before the vibration test.

TABLE 1

| | Capacitor | Discharge capacity (F) | Average discharge output (W) |
|---|---|---|---|
| Example 1 | Before vibration test | 3250 | 118 |
| | After vibration test | 3240 | 117 |

COMPARATIVE EXAMPLE 1

A stacked assembly was formed in the same manner as in Example 1 except that any electrically insulating member was not used and an insulating ring and two insulating washers were used for each of the screw terminal for a positive electrode and the screw terminal for a negative electrode in the embodiment as shown in FIG. 2, and these screw terminals were fixed to the cover member by fastening the nuts. However, when a rotation torque was applied to each of the screw terminals by turning the nuts, the screw terminals were easily rotated along with the nuts, and it was very difficult to completely fix the screw terminals to the cover member.

The stacked type capacitor finally produced was fixed to the vibration test machine, and the capacitor was vibrated under the conditions that vibration cycle was changed (by alternately changing between 13 Hz and 30 Hz for 5 min) by the application of a vibration acceleration of 3 G (in X, Y and Z directions). However, when the vibration was continued for 15 min, the looseness of the screw terminals was found and the leakage of the electrolyte was recognized. As a result, experiment was stopped.

In accordance with the electric double layer capacitor of the present invention, the electrode terminals are fixed to the metallic cover member in a state that they are electrically isolated from the metallic cover member and the rotation of the terminals with respect to the axial direction is prohibited. Accordingly, even when a torque for rotating the terminals with respect to the axial direction is applied thereto by fastening the nuts when the electrode terminals are to be fixed to the cover member, there is no danger of rotating of the shaft portion of screw terminals, constituting the electrode terminals, along with the nuts.

In the capacitor of the present invention, even when the nuts are loosened during usage of the capacitor, there is no risk of rotating the screw terminals along with the nuts. Accordingly, the nuts can be fastened without causing the twisting of the current collecting leads connected to the terminals.

Obviously, numerous modifications and variations of the present invention are possible in light of the above teachings. It is therefore to be understood that within the scope of the appended claims, the invention may be practiced otherwise than as specifically described herein.

What is claimed is:

1. An electric double layer capacitor comprising:

a positive electrode provided with a positive current collecting lead and a negative electrode provided with a negative current collecting lead interposed by a separator in a bottomed metallic casing filled with an electrolyte, wherein at least one of the positive current collecting lead and the negative current collecting lead is connected to at least one of respective electrode terminals attached in an electrically insulated state to a metallic cover member for sealing an opening of the metallic casing;

each of the electrode terminals including an engaging plate formed integrally with a shaft portion of the terminal, and the engaging plate having a linear edge portion which is brought into contact with an electrically insulating member disposed inside the metallic cover member to prevent the electrode terminal from rotating with respect to the axial direction of the terminal.

2. The electric double layer capacitor according to claim 1, wherein the at least one of respective electrode terminals includes paired positive and negative electrode terminals, and wherein the positive current collecting lead and the negative current collecting lead are respectively connected to the paired positive and negative electrode terminals which are attached in an electrically insulated state to the metallic cover member for sealing the opening of the bottomed metallic casing; each of the paired electrode terminals has the engaging plate formed integrally with the shaft portion of the terminal, and the engaging plate is engaged with the electrically insulating member.

3. The electric double layer capacitor according to claim 2, wherein said electrically insulating member is engaged with the engaging plate of each of the paired electrode terminals to prevent the paired electrode terminals from rotating with respect to the axial direction of the terminals.

4. The electric double layer capacitor according to claim 1, wherein said electrode terminals are screw terminals.

5. The electric double layer capacitor according to claim 4, wherein the electrically insulating member is fixed to the inside of the metallic cover member by means of the engaging plate and two screw terminals.

6. The electric double layer capacitor according to claim 1, wherein the positive electrode and the negative electrode are respectively provided with a plurality of current collecting leads, and the plurality of current collecting leads are connected to the positive electrode and the negative electrode in a collected form respectively.

7. The electric double layer capacitor according to claim 1, wherein the engaging plate has a lower portion to which an electricity collecting plate is electrically connected, and a plurality of the current collecting leads are connected to the electricity collecting plate in a collected form.

8. The electric double layer capacitor according to claim 1, wherein a plurality of rectangular positive electrodes and a plurality of rectangular negative electrodes are alternately stacked by interposing separators therebetween, and the stacked assembly is received in the metallic casing having a rectangular shape.

9. The electronic double layer capacitor according to claim 1, wherein the engaging plate is formed of a substantially square shape.

10. A method for preventing a rotating motion of an electrode terminal in an electric double layer capacitor comprising a positive electrode provided with a positive current collecting lead and a negative electrode provided with a negative current collecting lead interposed by a separator in a bottomed metallic casing filled with an electrolyte, the method comprising the step of:

connecting at least one of the positive current collecting lead and the negative current collecting lead to at least one of respective electrode terminals attached in an electrically insulated state to a metallic cover member for sealing an opening of the metallic casing, each of the electrode terminals having an engaging plate formed integrally with a shaft portion thereof, and the engaging plate having a linear edge portion which is brought into contact with an electrically insulating member disposed inside the metallic cover member.

11. The method for preventing a rotating motion of an electrode terminal in an electric double layer capacitor according to claim 10, wherein the at least one of respective electrode terminals includes paired positive and negative electrode terminals, and wherein the positive current collecting lead and the negative current collecting lead are respectively connected to the paired positive and negative electrode terminals which are attached in an electrically insulated state to the metallic cover member for sealing the opening of the bottomed metallic casing; each of the paired electrode terminals has the engaging plate formed integrally with the shaft portion of the terminal, and the engaging plate is engaged with the electrically insulating member.

12. The method for preventing a rotating motion of an electrode terminal in an electric double layer capacitor according to claim 11, wherein said electrically insulating member is engaged with the engaging plate of each of the paired electrode terminals to prevent the paired electrode terminals from rotating with respect to the axial direction of the terminals.

13. The method for preventing a rotating motion of an electrode terminal in an electric double layer capacitor according to claim 12, wherein the electrically insulating member is fixed to the inside of the metallic cover member by means of the engaging plate and two screw terminals.

14. The method for preventing a rotating motion of an electrode terminal in an electric double layer capacitor according to claim 10, wherein said electrode terminals are screw terminals.

15. The method for preventing a rotation motion of an electrode terminal in an electric double layer capacitor according to claim 10, wherein the engaging plate is formed of a substantially square shape.

16. An electrochemical element comprising:

a positive electrode provided with a positive current collecting lead and a negative electrode provided with a negative current collecting lead interposed by a separator in a bottomed metallic casing filled with an electrolyte, wherein at least one of the positive current collecting lead and the negative current collecting lead is connected to at least one of respective electrode terminals attached in an electrically insulated state to a metallic cover member for sealing an opening of the metallic casing;

each of the electrode terminals including an engaging plate formed integrally with a shaft portion of the terminal, and the engaging plate having a linear edge portion which is brought into contact with an electrically insulating member disposed inside the metallic cover member to prevent the electrode terminal from rotating with respect to the axial direction of the terminal.

17. An electrochemical element according to claim 16, wherein the engaging plate is formed of a substantially square shape.

* * * * *